(12) United States Patent
Volberg et al.

(10) Patent No.: US 11,761,579 B2
(45) Date of Patent: Sep. 19, 2023

(54) LOAD HOLDER WITH LEVELLING MODULE AND MEASUREMENT MODULE

(71) Applicant: REUTLINGER GmbH, Frankfurt am Main (DE)

(72) Inventors: Jürgen Volberg, Troisdorf (DE); Wolfgang Peter, Altdorf (DE)

(73) Assignee: REUTLINGER GMBH, Frankfurt Am Main (DE)

( * ) Notice: Subject to any disclaimer, the term of this patent is extended or adjusted under 35 U.S.C. 154(b) by 151 days.

(21) Appl. No.: 17/396,758

(22) Filed: Aug. 8, 2021

(65) Prior Publication Data
US 2022/0042644 A1 Feb. 10, 2022

(30) Foreign Application Priority Data

Aug. 10, 2020 (DE) .......................... 102020121034.5

(51) Int. Cl.
| | |
|---|---|
| *B66D 1/48* | (2006.01) |
| *F16M 13/02* | (2006.01) |
| *G01C 9/02* | (2006.01) |
| *G01L 5/04* | (2006.01) |
| *G01L 5/10* | (2020.01) |

(52) U.S. Cl.
CPC .............. *F16M 13/022* (2013.01); *G01C 9/02* (2013.01); *G01L 5/047* (2013.01); *G01L 5/10* (2013.01)

(58) Field of Classification Search
CPC ........ F16M 13/022; G01C 9/02; G01L 5/047; G01L 5/10; F16G 15/08
See application file for complete search history.

(56) References Cited

U.S. PATENT DOCUMENTS

| 3,683,355 A | 8/1972 | Collins |
|---|---|---|
| 6,073,496 A | 7/2000 | Kuhn et al. |
| | (Continued) | |

FOREIGN PATENT DOCUMENTS

| CN | 105947911 A | 9/2016 |
|---|---|---|
| DE | 102012103515 A1 | 10/2013 |
| | (Continued) | |

OTHER PUBLICATIONS

Extended European Search Report for European Application No. 21190168, dated Jan. 5, 2022, 7pp.

*Primary Examiner* — Amy J. Sterling
(74) *Attorney, Agent, or Firm* — The Roy Gross Law Firm, LLC; Roy Gross

(57) ABSTRACT

The invention relates to a load holder (1, 200) for a suspension system for suspending loads, comprising fastening means (30, 30') for releasably fastening a suspension module (10) to and/or a suspension module (10) on a first end of the load holder (1, 200), as well as a load bearing device (60) at a second end of the load holder (1, 200), which faces away from the first end along a longitudinal direction (L) of the load holder (1, 200). In order to reduce the risk of falling loads when using the suspension system and to simply the correct set-up of the suspension system, the load holder (1, 200) further comprises a levelling module (20, 20') for adjusting a length (L1, L2) of the load holder (1, 200) in the longitudinal direction (L) and a measurement module (40) for measuring a tensile load between the load bearing device (60) and the first end.

18 Claims, 6 Drawing Sheets

(56) References Cited

U.S. PATENT DOCUMENTS

| | | | | |
|---|---|---|---|---|
| 7,810,791 B2* | 10/2010 | DeVos | ................... | B66D 3/18 |
| | | | | 254/270 |
| 2009/0020492 A1 | 1/2009 | DeVos | | |
| 2017/0089781 A1* | 3/2017 | Varella E Silva | ...... | F16G 15/08 |
| 2018/0319312 A1* | 11/2018 | Cooper | ................... | G01L 5/10 |
| 2018/0361267 A1* | 12/2018 | Brooks | ............... | F16M 13/022 |
| 2019/0210844 A1* | 7/2019 | Redder | ................. | F16G 15/08 |
| 2022/0042862 A1* | 2/2022 | Kadota | ................. | G01L 1/042 |

FOREIGN PATENT DOCUMENTS

| | | |
|---|---|---|
| KR | 100988762 B1 | 10/2010 |
| WO | 2019052675 A1 | 3/2019 |

* cited by examiner ately during the entire installation of the suspension system and the load. The tensile load can also be measured continuously over days and weeks during an event. Any changes in the distribution of loads over the various suspension points and load holders are noticed immediately. Critical changes in the load distribution can be noticed in time and corresponding safety measures can be taken. For example, a warning is given, the event is cancelled, and/or the load is lowered before it accidentally falls.

LOAD HOLDER WITH LEVELLING MODULE AND MEASUREMENT MODULE

CROSS REFERENCE TO RELATED APPLICATIONS

This application claims the benefit of priority of German Patent Application No. 102020121034.5 filed on Aug. 10, 2020, the contents of which are all incorporated herein by reference in their entirety.

The present invention relates to a load holder for a suspension system for suspending loads, comprising fastening means for releasably fastening a suspension module to and/or a suspension module on a first end of the load holder, as well as a load bearing device at a second end of the load holder, which faces away from the first end along a longitudinal direction of the load holder. The invention further relates to a load holder system having at least one load holder.

Suspension systems are used at events such as trade fairs, concerts, exhibitions, presentations and conferences in order to attach loads to suspension points for mobile, displaceable or temporary applications. Lights, large screens, fair boards, fair banners, information displays and the like are suspended, for instance.

The suspension points are typically arranged in a grid on the ceiling of a hall or on support beams.

The individual suspension points have a limited holding load. Several suspension points are used at the same time for suspending a large and/or heavy load. A suspension system distributes the weight force of the load to the various suspension points. In this case, a weight force of the load should be applied to the various suspension points as uniformly as possible.

For example, several suspension points are used on the ceiling of an exhibition hall for suspending a large and heavy screen at a trade fair event. First of all, an elongated intermediate cross-bar is hung from the several suspension points. The screen is then hung on the intermediate cross-bar. The intermediate cross-bar helps to distribute a weight force of the screen to the several suspension points. The intermediate cross-bar also helps to correctly align the display horizontally. A large intermediate cross-bar can itself have a weight of approximately one tonne (1,000 kg).

Load holders can be used to connect the intermediate cross-bar to the individual suspension points and/or to connect the load, for example the screen, to the intermediate cross-bar. For example, one of the load holders can be used to connect a wire rope for suspension to a suspension hook of another wire rope. The load holders are therefore used as an intermediate or connection element in the overall suspension system.

The maximum tensile load of an individual suspension point is often in a range of the weight force of a mass of 50 kg to 150 kg. The holding load of a suspension point must not be exceeded. Otherwise, there is a risk of the load crashing down (i.e. falling down unintentionally and/or in an uncontrolled manner). Crashing-down loads can cause material damage, injuries and even death. For trade fairs, it is therefore sometimes necessary to demonstrate before the opening that the holding loads of the individual suspension points are not exceeded in each case.

For this purpose, tensile load measuring devices have up to now been temporarily integrated into the suspension system. The load for the individual suspension points is checked using the tensile load measuring devices. However, the additional tensile load measuring devices are expensive.

The lengths of the various wire ropes and/or chains also have to be adjusted at some expense for the correct horizontal alignment of the load and to correctly distribute the weight force to the individual suspension points.

If, after setting up the suspension system and hoisting the load, it turns out that the load distribution is not as desired, the load has to be lowered again and the load system modified.

The additional installation of the tensile load measuring devices for testing and the adjustment of the suspension system to optimise the load distribution are time-consuming and demand a lot of effort. This results in high additional costs.

In addition, the tensile loads for the individual suspension points can change again after checking and after removing the respective tensile load measuring device. For example, the intermediate cross-bar can bend, changing the load distribution in the suspension system. This also changes the tensile loads applied to the individual load holders and suspension points. Even a small change in length of individual wire ropes or chains of the suspension system, for example caused by temperature changes or material creep, can easily lead to considerable changes in the load distribution. Furthermore, external factors such as wind or ice formation on the suspension system and/or on the load, especially outside, can cause tensile loads on the individual suspension points and load holders to change. Even if it is correctly demonstrated at the beginning that the maximum tensile loads of the components of the suspension system and/or of the suspension points have not been exceeded, this can still occur later without being noticed.

In addition, the previous procedure does not guarantee simultaneous checking of all relevant tensile loads when adjusting and setting the suspension system. In particular, when hoisting or lowering the load, the load is often unintentionally aligned asymmetrically and there is thus also an asymmetrical load distribution. As a result, the maximum tensile loads of individual wire ropes, chains, load holders and/or suspension points are quickly exceeded.

For the reasons mentioned, despite extensive safety measures, tensile load thresholds are exceeded time and again, and loads, such as large screens that are suspended or hung from suspension points with a suspension system, thus unintentionally fall.

The object of the present invention is to create a device which reduces the risk of loads crashing-down when using a suspension system and simplifies the correct set-up of the suspension system.

The above object is achieved by a load holder for a suspension system for suspending loads having the features of claim 1.

The load holder comprises fastening means for fastening a suspension module to and/or a suspension module on a first end of the load holder;

a load bearing device at a second end of the load holder, which faces away from the first end along a longitudinal direction of the load holder;

a levelling module for adjusting a length of the load holder in the longitudinal direction; and a measurement module for measuring a tensile load between the load bearing device and the first end.

As the load holder itself includes the measurement module, the tensile load can be measured at any time. The tensile load can be measured already when setting up and adjusting the suspension system and in particular already when hoisting the load and also when lowering the load. The present load holder enables the tensile load to be measured continuously and/or regularly. The tensile load can in particular be the total weight force or a portion of the total weight force of the load suspended from the load holder.

Exceeding a certain tensile force is detected easily, safely and reliably at any time. If several load holders are used, this applies to each of the load holders. Unforeseeable changes to the load distribution between individual load holders are also detected easily, safely, quickly and reliably.

In the present invention, both the measurement module and levelling module are integrated into the load holder. The load holder thus simplifies the assembly and set-up of the suspension system. When setting up and adjusting the suspension system, fewer components have to be delivered, installed, connected, coordinated and checked. Accordingly, dismantling is also easier. According to a further aspect, the load holder enables simpler and more compact suspension systems with fewer parts.

As already mentioned, the levelling module allows the length of the load holder to be adjusted. The levelling module thus enables a balancing of the load distribution in the suspension system and a fine adjustment of the position of the suspended load and/or cross-bar. Often, even small changes in length are enough to noticeably alter the load distribution.

The levelling module enables the controlled, targeted adjustment of the length of the load holder. In other words, it enables the controlled, targeted setting of the length of the load holder. Within an adjustment range for the length of the load holder, the length of the load holder can be specifically adjusted to the desired length. The active, controlled, targeted adjustment of the length and thus setting to the desired length enables the simple, safe and reliable fine adjustment and balancing of the load distribution in the suspension system. The set length does not (at least substantially) change (by itself) as a function of the load acting on the load holder. The setting of the length is, in this sense, independent of the load.

When using the load holder in the suspension system, the lengths of ropes and/or chains of the suspension system itself therefore do not have to be changed for balancing and fine adjustment. This massively simplifies and speeds up the process of setting up and adjusting the suspension system for suspending the load. In addition, avoiding changing lengths of wire ropes and/or chains increases safety, as this prevents any associated operating errors.

In particular, the levelling module is set up to adjust the length of the load holder under load. The load holder can therefore be used to change an orientation of the load in the suspension system even while a load is being hoisted and after the load has been hoisted. The load holder enables fine adjustment and/or balancing without lowering the load.

In summary, the load holder ensures increased safety and simplifies the correct set-up of the suspension system. In particular, it reduces the risk of loads crashing-down when using the suspension system and simplifies balancing and fine adjustment.

The load holder can be used, for example, for events, stage technology and/or trade fairs.

The load holder can also be used for unloading above an operator. Personal protection is ensured.

The load holder is suitable for vertically suspended loads. This means that a pull direction is (at least substantially) parallel to a direction of gravity. Moreover, the load holder is also suitable for loads suspended at an angle. This means that the pull direction can have an angle of up to ±60° to the direction of gravity.

In a further embodiment of the invention, the load holder includes a wire rope holder as the suspension module. This allows the load holder to be simply and safely suspended from a suspension point above. Wire rope holders are suitable for high loads and are very reliable. Wire ropes tend to be less clearly visible and more flexible than chains. In addition, they are less susceptible to noises with air flows and offer less wind attack surface than chains.

Alternatively or in addition, the load holder preferably comprises a chain hoist engagement means as the suspension module. This allows the load holder to be simply and safely suspended from a suspension point above. Even high tensile loads can be simply and cost-effectively managed with chains or chain hoists. Compared to wire ropes, chains tend to be more robust against corrosion and less susceptible to dirt. They are easier to adjust for specific lengths.

The load holder preferably comprises the fastening means for releasably fastening the suspension module to the first end of the load holder. The fastening means can be arranged on the levelling module and/or on the measurement module, for example as an internal thread or as an external thread.

Particularly preferably, the load holder comprises the fastening means and at least one suspension module, for example the wire rope holder and/or the chain hoist engagement means. The suspension module can be releasably fastened to the fastening means, for example by means of a screw connection. An eye bolt or a ring nut can be used as releasably fastened chain hoist engagement means, for example.

Highly preferably, the load holder comprises the releasably attachable wire rope holder and the releasably attachable chain hoist engagement means. Depending on the situation, either the wire rope holder or the chain hoist engagement means can then be fastened to the fastening means and used for suspending the load holder.

The suspension module can be integrally attached to the levelling module or to the measurement module. It can, for example, be welded on. In this embodiment, no additional fastening means for releasably fastening the suspension module is required, of course. The fastening means can accordingly be dispensed with in this embodiment. This avoids a potential source of operating errors or of the use of parts that do not match. However, modularity and flexibility are reduced.

The levelling module is preferably attached to the measurement module. Particularly preferably, the levelling module is releasably attached to the measurement module. By way of example, the levelling module can be releasably attached to the measurement module by means of a threaded connection. It can, however, be provided that the levelling module is attached to the measurement module by means of the threaded connection and is additionally adhesively bonded. This prevents the levelling module unintentionally detaching from the measurement module. The adhesion can be designed in such a way that it can be overcome with increased force. This means that the two parts can still be detached from one another when necessary, for example in order to replace one of the parts.

The load bearing device can be attached directly to the measurement module or directly to the levelling module, preferably releasably. By way of example, the load bearing device can be screwed to the measurement module or to the levelling module. This provides more modularity and flexibility. The load bearing device can be easily replaced. For example, different types of load bearing devices can be used with the same load holder. It can also be provided that the load bearing device is attached to the measurement module or levelling module by means of a threaded connection and is additionally adhesively bonded. This prevents the levelling module unintentionally detaching from the measurement module. The adhesion can be designed in such a way that it can be overcome with increased force. This means that the two parts can still be detached from one another when necessary, for example in order to replace one of the parts.

In a further embodiment of the invention, the measurement module is arranged in the longitudinal direction between the load bearing device and the levelling module. As a result, the measurement module is positioned as close as possible to the load bearing device. When the load holder is suspended, the measurement module is particularly clearly visible. An optical warning device described further below can thus be seen particularly well and easily from below. In addition, the measurement module can be reached from below particularly easily for maintenance, test and/or diagnostics purposes. By way of example, any batteries or accumulators of the measurement module can be replaced more easily when the load holder is suspended from a suspension point.

According to another aspect, a second arrangement in the order load bearing device, measurement module, levelling module and possibly suspension module along the longitudinal direction (from bottom to top if the load holder is suspended) is particularly preferable. The levelling module is narrower than the measurement module across the longitudinal direction. In the first arrangement, the measurement module is positioned comparatively far away from the suspension module. In this arrangement, the measurement module obscures the view (slightly to the side) of the suspension module from below the least. The view of the load bearing device from below is easily possible in any case. It is therefore particularly easy to verify with a glance whether both the suspension of the load holder by means of the suspension module, for example from a cross-bar of the suspension system, and the suspension of the actual load from the load bearing device of the load holder are correct.

Alternatively, the following third arrangement along the longitudinal direction is, for example, possible (from bottom to top if the load holder is suspended): load bearing device, levelling module, measurement module and possibly suspension module. In this arrangement, the levelling module can be reached and adjusted from below particularly easily. This simplifies the adjustment of the levelling module after suspension of the load.

Particularly preferably, the load holder has a modular design such that it can be converted between the first arrangement, the second arrangement and the third arrangement.

The levelling modules preferably comprises:

a central sleeve;

a first screw-out module (first winding-out module), which engages with the central sleeve via a first threaded connection and protrudes from the central sleeve at a first side of the central sleeve in the longitudinal direction with a first protruding length, wherein the first protruding length can be varied (adjusted) by turning the central sleeve relative to the first winding-out module; and a second screw-out module (a second winding-out module), which engages with the central sleeve via a second threaded connection and protrudes from the central sleeve at a second side of the central sleeve in the longitudinal direction, which faces away from the first side, with a second protruding length, wherein the second protruding length can be varied (adjusted) by turning the central sleeve relative to the second winding-out module.

Particularly preferably, the first threaded connection and the second threaded connection have opposite thread directions. In a first embodiment, the first threaded connection is designed as a left-hand thread and the second threaded connection is designed as a right-hand thread. In a second embodiment, the first threaded connection is designed as a right-hand thread and the second threaded connection is designed as a left-hand thread. As a result, by rotating the central sleeve (relative to the first winding-out module and the second winding-out module) about the longitudinal direction in a first rotational direction, both the first winding-out module and second winding-out module can be simultaneously further screwed out (wound out) of the central sleeve. This simultaneously increases the first protruding length and the second protruding length in a single work step. Accordingly, by rotating the central sleeve (relative to the first winding-out module and the second winding-out module) about the longitudinal direction in a second rotational direction, which is opposite the first rotational direction, both the first winding-out module and second winding-out module can be simultaneously further screwed into (wound into) the central sleeve. This simultaneously decreases the first protruding length and the second protruding length in a single work step. If thread pitches of the first threaded connection and second threaded connection are the same, a complete central sleeve will therefore result in twice the stroke compared to a version with only one threaded connection. Consequently, a length of the levelling module in the longitudinal direction and thus the length of the entire load holder in the longitudinal direction can be adjusted very easily, very quickly and very safely. The length adjustment can also be carried out under load.

According to another aspect, a circumferential surface of the central sleeve particularly preferably comprises a spanner area. The spanner area is adapted to engage with a spanner jaw of a spanner. As a result, the central sleeve can be easily rotated about the longitudinal direction.

Particularly preferably, the first winding-out module comprises a sleeve engagement element with an external thread for the first threaded connection on a second side, facing the central sleeve, in the longitudinal direction, and a flange on a first side facing away from the central sleeve in the longitudinal direction, wherein the fastening means for releasably fastening the suspension module or the suspension module is formed on this flange. In another arrangement, the fastening means can, if necessary, be used for fastening the measurement module. A spanner area can additionally be designed on the flange. The fastening means can, for example, comprise an internal thread or an external thread. When the fastening means comprises an internal thread, a tapped hole for a safety screw is optionally provided in an outer wall of the fastening means with the internal thread along a radial direction perpendicular to the longitudinal direction.

Highly preferably, the sleeve engagement element of the first winding-out module comprises an unscrewing protection device. The unscrewing protection device prevents the sleeve engagement element and thus the first winding-out module from being fully unscrewed from the central sleeve. This secures the first threaded connection. The unscrewing protection device prevents crash-down (unintentional falling) of loads and thus increases safety.

Particularly preferably, the second winding-out module comprises a sleeve engagement element with an external thread for the second threaded connection on a first side facing the central sleeve in the longitudinal direction, and a flange on a second side facing away from the central sleeve in the longitudinal direction, wherein the fastening means for releasably fastening the measurement module and/or load bearing device is designed on this flange. A spanner area can additionally be designed on the flange. The fastening means can, for example, comprise an internal thread or an external thread. When the fastening means comprises an internal thread, a tapped hole for a safety screw is optionally provided in an outer wall of the fastening means with the internal thread along a radial direction perpendicular to the longitudinal direction.

Highly preferably, the sleeve engagement element of the second winding-out module comprises an unscrewing protection device. The unscrewing protection device prevents the sleeve engagement element and thus the second winding-out module from being fully unscrewed from the central sleeve. This secures the second threaded connection. The unscrewing protection device prevents crash-down (unintentional falling) of loads and thus increases safety.

In a preferred embodiment, the measurement module has a load cell. It can be a digital load cell. The load cell is a simple, space-saving, reliable and cost-effective option for measuring the tensile load. The load cell can have at least one strain gauge. Measurement may be carried out by means of a resistance measuring bridge. In particular, the load cell can have a strain gauge full bridge. The load cell can have a Z-shaped main body. The main body preferably consists of aluminium or an aluminium alloy.

The load holder preferably comprises an optical warning device, which displays an optical load warning when the measured tensile load exceeds a load threshold, and/or displays an optical maximum load warning when the measured tensile load exceeds a maximum load threshold.

The maximum load warning clearly indicates to the user that the maximum load threshold has been exceeded and thus increases safety.

The maximum load threshold can particularly preferably be pre-set. This means that the pre-settable maximum load threshold can be adjusted and configured. The maximum load threshold can, for example, be programmed.

As mentioned, a holding load of a suspension point is often in a range of the weight force of a mass with 50 kg to 150 kg. However, the holding loads for the suspension points differ very greatly at different venues. Sometimes, the holding loads even differ for different suspension points at the same location, for example in the same exhibition hall. In this embodiment, the pre-settable maximum load threshold can be set for the maximum load warning. For example, the user can set the pre-settable maximum load threshold to the permitted suspended load of the respective suspension point. On the other hand, this increases safety. On the other hand, the load holder including the appropriate load warning can be used universally for suspension points with different suspended loads. This considerably increases the flexibility of the load holder.

The optical maximum load warning can comprise a red indicator light, for example at least one red LED. The red colour clearly indicates that a critical load condition has been reached.

Highly preferably, the maximum load threshold can be set at a maximum as high as a permissible working load of the load holder. It may be the case that the suspension points at a location are particularly robust. Their maximum tensile load then exceeds the permitted working load of the load holder. The functionality described prevents the permitted working load of the load holder from being exceeded without the maximum load warning being displayed. In addition, the user is made aware of the problem in advance if they try in vain to set the maximum load threshold to a value greater than the permitted working load.

According to a further aspect, the optical warning device is configured to display the maximum load warning independently of the maximum load threshold if the measured tensile load exceeds the permitted working load of the load holder. Even if no maximum load threshold is set or can be set, the maximum load warning is still shown if the permitted working load is exceeded.

The optical load warning differs from the optical maximum load warning. By way of example, a colour of the optical load warning can differ from a colour of the optical maximum load warning.

The optical load warning can comprise a yellow indicator light, for example at least one yellow LED. The yellow colour indicates that a concerning load condition has been reached.

The load threshold can be pre-settable, in particular as an absolute value, as a selectable percentage of the maximum load threshold and/or by specifying a difference by the which the load threshold is smaller than the maximum load threshold.

The pre-settable value for the load threshold can be limited upwards by the maximum load threshold.

Alternatively or in addition, the load holder can be designed to set the load threshold automatically based on the maximum load threshold. In particular, the load threshold can automatically be a set percentage of the maximum load threshold, for example ninety percent. Alternatively, the load threshold can automatically correspond to the value of the maximum load threshold minus a set value, for example the maximum load threshold minus 0.1 kN. If the maximum load threshold can be pre-set and is adjusted, the load threshold adjusts automatically accordingly.

In one preferred embodiment, the optical warning device comprises an optical release signal. If the load threshold is present, the optical warning device only displays the release signal if the measured tensile load is smaller than the pre-set load threshold. If the maximum load threshold is present, the optical warning device only displays the release signal if the measured tensile load is smaller than the maximum load threshold.

The optical release signal differs from the other optical displays of the optical warning device (for example, from the optical maximum load warning and the optical load warning) for example in the light colour.

The optical release signal can comprise a green indicator light, for example at least one green light-emitting diode. The green colour indicates that the load holder is switched on and there is a harmless load condition.

In particular, the optical warning device can comprise a traffic light display: the green indicator light for the optical release signal, the yellow indicator light for the optical load warning and the red indicator light for the optical maximum load warning.

In summary, the optical warning device can be designed to visually display a limited number of different load conditions in an unambiguous and easily distinguishable manner. Such a display can be read at any time and is easily understandable, even for non-qualified persons and/or those without particular training.

In a further embodiment, the optical warning device displays an optical overload warning as soon as the measured tensile load has exceeded a pre-set overload threshold. The overload warning thus also remains when the measured tensile load goes down again. Alternatively or in addition, the load holder can be designed to store the overload warning. This prevents an overloaded load holder, which might be damaged, from accidentally being used again. This achieves effective protection from damage due to the failure of the load holder caused by overload.

The optical overload warning differs from the displays of the optical warning device for other load conditions. For example, the optical overload warning may manifest itself in the simultaneous flashing of the green indicator light, the yellow indicator light and the red indicator light.

The overload threshold can, for example, correspond to a multiple of the permitted working load of the load holder, in particular double the permitted working load of the load holder.

It can be provided that the overload warning cannot be switched off and/or deleted or can only be switched off and/or deleted by qualified persons. By way of example, the load holder can be designed in such a way that a set code is required to deactivate the overload warning and/or to delete the overload warning in the memory. This ensures that the load holder is scrapped after the overload threshold has been exceeded or is released for use again only after inspection and approval by one of the qualified persons. Damaged load holders can be taken out of service and load holders that are still operational can be re-used. The latter saves costs and resources.

The optical warning device can, for example, be arranged in the measurement module. The optical warning device can preferably be seen from the second side. The optical warning device is visible from below if the load holder is attached to a suspension point. Highly preferably, the optical warning device is visible from the second side (from below) within a cone around the longitudinal direction with a half opening angle of at least 25°, more preferably at least 40°, especially preferably at least 80°. The peak of the imaginary cone is in this case arranged in the load holder and the imaginary cone opens on the side of the second end of the load holder (downwards). If the load holder is attached to a suspension point, the optical warning device is therefore visible both vertically from below and obliquely to the longitudinal direction from below. As a result, the optical load warning and/or the optical maximum load warning are rather noticeable. In addition, when using several load holders in a row and/or one behind another, the user can check all optical warning devices of the several load holders simultaneously from one location. "Several" always means "at least two" in the sense of this disclosure.

In a particularly preferred embodiment, the load holder comprises input means for setting the pre-settable maximum threshold and/or the pre-settable load threshold. The setting means can, for example, comprise a touchpad, at least one button and/or at least one control (such as a knob, for example). In general, however, it is not required for the load holder to have input means. Alternatively or in addition, the pre-settable maximum load threshold and/or the pre-settable load threshold can be programmed or set by means of a data transfer module, for instance (see further below).

Alternatively or in addition, the load holder comprises an audible warning device, which emits an audible load warning when the measured tensile load exceeds the load threshold, and/or emits an audible maximum load warning when the measured tensile load exceeds the maximum load threshold.

The audible maximum load warning differs from the audible load warning. The audible maximum load warning and the audible load warning can, for example, differ in volume, pitch and/or tone sequence.

The embodiments and advantages listed for the optical warning device apply accordingly to the audible warning device.

The audible warning device can, for example, have a loudspeaker, signal horn and/or siren.

In particular, an audible maximum load warning is useful for urgently drawing attention to the danger of exceeding the maximum load threshold. By way of example, the audible maximum load warning can be combined with the optical warning device with an optical load warning and an optical maximum load warning.

In one preferred embodiment, an end part of the load bearing device on the second end can be rotated by 360° along the longitudinal direction. The end part is designed to be connected to a load applying element.

By way of example, the load bearing device has a ring, shackle or hook, which can be rotated 360° around the longitudinal direction It may be a D-ring, for example. These embodiments enable the load to be suspended from the load holder quickly, easily and safely. In particular, the load bearing device can have a swivel joint, wherein the ring, shackle or hook is attached to the load holder via the swivel joint.

The freely rotating end part, for example the freely rotating ring, shackle or hook, prevents the application of transverse and shear forces on the load holder. This increases the reliability, safety and significance of the tensile force measured by the measuring cell.

The measurement module preferably has an electronic module. By way of example, the electronic module is designed to read out and/or evaluate the data of the load cell. The electronic module can, for example, have a processing unit and a memory module. It can, for example, be designed to determine whether the measured load exceeds the pre-settable load threshold, the maximum load threshold and/or the overload threshold. It can also be designed to control the optical warning device and/or the audible warning device as described above. The optical warning device can be integral with the electronic module. Alternatively or in addition, the audible warning device can be integral with the electronic module.

In a further embodiment, the memory module is not accessible and enclosed in a housing. This prevents manipulations and deletion of the data stored in the memory module.

Particularly preferably, the load holder is designed to regularly measure the tensile load. Alternatively or in addition, the load holder is designed to indicate the load condition regularly via the optical warning device and/or the audible warning device.

Highly preferably, a time interval can be set, for example programmed, for respectively successive measurements. The embodiments concerning the adjustability or programmability of the pre-set load threshold apply accordingly in each case. On the one hand, measurements at regular intervals save electricity and, on the other hand, ensure permanent monitoring of the tensile load, thus providing lasting security.

Particularly preferably, the electronic module is designed to log, in particular to store, the measured tensile load and/or the load condition continually and/or at time intervals. This provides ongoing documentation. Changes to the measured tensile load are documented over the entire period of an event.

The documentation can, for example, be stored in the memory module.

According to another aspect, the load holder has an energy storage receptacle (a receptacle for receiving an energy storage module) and/or an energy storage module. The energy storage module can, for example, be an integrated battery or an integrated accumulator. The energy storage receptacle is used to hold at least one energy storage module. The energy storage receptacle can, for example, be designed as a battery compartment. In this way, the batteries or accumulators can be easily replaced. The energy storage receptacle can, for example, have a cover that can be opened. The energy storage receptacle or the at least one energy storage module is used to supply the measurement module with electrical energy. The cover can, for example, be screwed onto the housing of the measurement module. This prevents the cover from being unintentionally opened.

If the energy storage module comprises one or several accumulators, a battery life of the load holder during operation is preferably at least 24 hours, even better at least 14 days. As a result, the load holder can be continually operated without external power supply over a day or over the entire length of an event.

Highly preferably, the load holder has a charging module for charging the energy storage unit. In a further embodiment, the charging module is designed such that the energy storage unit can be externally inductively charged by means of the charging module. For example, the housing of the measurement module can then be fully enclosed and completely water-tight. This increases reliability, especially in use outdoors.

According to another aspect, the measurement module can alternatively or in addition have a power connection for supplying electric current from outside. By way of example, the power connection can be configured for the connection of an XLR connector for power supply, for example for the connection of a two-pole XLR connector or a four-pole XLR connector. Such connections have proven themselves in event technology.

In a further embodiment of the invention, the load holder has an idle mode (standby mode). The load holder can be put in idle mode to save electricity. The load holder can be woken up from idle mode. The load holder then switches to an operating mode. The load holder can have an operating device on the housing to put the load holder in idle mode and to wake the load holder up from idle mode. The operating device can, for example, comprise a push button.

The load holder preferably has a data transfer module. The data transfer module can be designed for the transfer of the measured tensile load and/or a load condition of the load holder, wherein the load condition is determined at least based on the measured tensile load as well as the load threshold and/or maximum load threshold.

In particular, the data transfer module can be designed for the wireless transfer of
the measured tensile load,
a load condition of the load holder,
the measured temperature, and/or
a charging status of the power storage unit.

Particularly preferably, the data transfer module can send and/or receive other data wirelessly.

The data transfer module can, for example, be designed for the wireless transfer in at least one freely accessible frequency range, for example around 868 MHz (SRD band Europe) and/or 915 MHz (ISM band, region 2). Bluetooth Low Energy (BLE), Long Range Wide Area Network (LoRa) and/or Zigbee can in particular be implemented as the wireless network standard.

According to one aspect, the data transfer module is particularly preferably designed for bidirectional communication. This means that the data transfer module is designed both for sending data and receiving data.

According to one aspect, the load holder can be programmed wirelessly (or contactlessly). In particular, the electronic module can be programmed wirelessly.

The load holder can be designed so that the load threshold, the maximum load threshold and/or the overload threshold can be programmed by means of the data transfer module.

Alternatively or in addition, the load holder is highly preferably designed so that it can be wirelessly put in idle mode and/or can be wirelessly woken up from idle mode by means of the data transfer module. The load holder can thus also be controlled in a targeted manner from a distance in order to save electricity. It is not necessary to dismantle the load holder or to operate a switch directly on the load holder in order to activate or deactivate idle mode. In many cases, this would require the use of a ladder or a lifting platform, for example, when the load holder is in place.

According to one aspect, the measurement module is preferably calibrated. A measurement range can be set by means of calibration prior to delivery. Calibration can, for example, be based on a traversal of support points in a characteristic curve.

The measurement module can preferably be re-calibrated. The measurement accuracy of the measurement module is ensured by regular re-calibration. Systematic measurement errors which arise over time can be compensated again by means of re-calibration. The measurement module can be adjusted accordingly. The re-calibration can particularly preferably be programmed. Therefore, no mechanical changes have to be made to the measurement module for re-calibration. This reduces costs and prevents potential mechanical sources of error. The measurement module can be designed so that re-calibration settings can be made via the data transfer module.

Highly preferably, the re-calibration can only be set by a qualified person. By way of example, the measurement module can be designed to only enable re-calibration when the measurement module has received a specific activation code. The measurement module can further be designed to switch to a safe state if a manipulation attempt without authorisation has been detected. This means that the measurement module is deactivated. For this, the electronic module can have a functional safety unit. In addition, the optical warning device can display a corresponding warning message and/or the data transfer module can send a warning message.

Highly preferably, the measurement module has a separate memory for calibration data. For example, reference values can be saved in the memory for calibration data.

In a further embodiment, changes in calibration or re-calibration are automatically recorded.

According to another aspect, the measurement module preferably has the housing. The load cell, optical warning device, audible warning device, electronic module, data transfer module, energy storage receptacle and/or energy storage unit can be housed in the housing. The housing can be splash-proof or water-tight. This increases the reliability of the load holder and in particular of the measurement module, particularly in outdoor use.

The housing is preferably at least partly made of polyethylene (PE) and/or polyethylene terephthalate (PET).

The housing can be made of transparent and/or partially transparent plastic, at least in areas. This means that, for example, LEDs of the optical warning device can be arranged inside the housing so as to be protected and their light may still be visible from outside.

According to another aspect, the housing comprises at least two housing parts in a further embodiment, which are held together by screws. In particular, it can have exactly two housing halves, which are held together by screws.

Particularly preferably, an additional support structure is provided inside. The optical warning device, audible warning device, temperature sensor, electronic module and/or energy storage receptacle can be attached to the support structure. The support structure can at least partially cover the measuring cell. This protects the measuring cell additionally, in particular when the housing is open. The support structure can, for example, be a sheet metal part with a U-shaped cross-section, wherein the measuring cell is arranged in an interior space of the sheet metal part between two leg surfaces.

In a further embodiment of the housing, the housing has shock protection. The shock protection can be made from an elastic material, for example from rubber. In particular, elastic shock pads can be arranged on corners and/or edges of the housing. When assembling and dismantling the load holder system, the load holder is often exposed to mechanical stresses. The shock protection reduces the risk of damage. Impacts are also absorbed thanks to the elastic design of the shock protection. This reduces the acceleration for the elements arranged in the housing in the event of jerky mechanical loads from outside on the housing and thus improves the durability and reliability of the load holder.

Alternatively or in addition, in a further embodiment, the load holder has at least protection rating IP44 according to EN 60529, particularly preferably IP 65.

The load holder preferably has a permitted working load of at least 100 kg, particularly preferably 160 kg, highly preferably at least 210 kg, for example 240 kg. The permitted working load thus exceeds the typical holding loads of suspension points. The load holder can thus be universally used, on the one hand, but is not oversized, on the other.

Alternatively or in addition, a breaking load of the load holder is at least ten times the permitted working load. This ensures a sufficient safety buffer.

In a further embodiment of the invention, the length of the load holder in the longitudinal direction can be adjusted by the levelling module under load by at least 3 cm, particularly preferably by at least 4 cm. In other words, the levelling module has a stroke that can be adjusted under load by at least 3 cm, particularly preferably by at least 4 cm. Such an adjustment range is usually sufficient for the fine adjustment and/or balancing of the load.

Alternatively or in addition, the length of the load holder in the longitudinal direction can be adjusted by the levelling module under load by at most 10 cm, particularly preferably by at most 5 cm. In other words, the levelling module has a stroke that can be adjusted under load by at most 10 cm, particularly preferably by at most 5 cm. By limiting the adjustability, the load holder remains compact, cheap, light and easy to operate.

According to a further aspect, the load holder preferably has an operating temperature range of at least −10° C. to +60° C., particularly preferably of at least −10° C. to +80° C. The load holder can therefore be used outside without hesitation. Moreover, it will remain operational even in strong sunlight and with poor ventilation.

In one preferred embodiment, the measurement module alternatively or in addition has a temperature sensor. The measurement module (in particular its electronic module) can be designed to store the temperatures detected by the temperature sensor in the memory module. Alternatively or in addition, the data transfer module can be designed to transfer the detected temperatures, preferably wirelessly.

The above object is further achieved by a load holder system for a suspension system of loads having at least one load holder according to one of the embodiments described. The modifications and advantages apply analogously.

The load holder system further has a central monitoring unit with a data transfer module for wireless communication with the at least one load holder.

The monitoring unit is used to monitor the measured tensile load and/or the load condition of all of the at least one load holder simultaneously.

The monitoring unit can, for example, comprise a personal computer, a notebook, a tablet computer and/or a smartphone.

The monitoring unit preferably comprises a display and is designed to display the measured tensile load and/or the load condition for all of the at least one load holder on the screen. The display can, for example, comprise a screen and/or an arrangement of light-emitting diodes. The user can thus tell at a glance whether one or more load holders are in a concerning or critical load condition. Particularly preferably, the display is designed for an overview display of the load conditions of all of the at least one load holder. The monitoring unit can be designed for a graphic representation of the structure of the suspension system. In particular, a program code for this functionality can be stored in it.

If the at least one load holder transmits the measured tensile load to the monitoring unit, the monitoring unit can determine the load condition instead of the at least one load holder or additionally itself on the basis of the measured tensile load.

Alternatively or in addition, the monitoring unit has input means. The input means can, for example, comprise a keyboard, a touchscreen, a touchpad, buttons, controls and/or a computer mouse.

In a further embodiment, the monitoring unit is designed to continually log, in particular store, the measured tensile load received by the at least one load holder and/or the load condition received by the at least one load holder. The monitoring unit can be designed to further log other or all data received by the at least one load holder. The monitoring unit can have a memory module for this purpose. Ongoing documentation is thus stored in the monitoring unit. Changes to the measured tensile load are documented over the entire period of an event.

In one preferred embodiment, the monitoring unit is designed for programming the maximum load threshold of the at least one load holder. The maximum load threshold can thus be easily set and altered by means of the monitoring unit. In particular, it is possible to centrally programme the maximum load thresholds of several load holders by means of the monitoring unit. The maximum load thresholds can thus be adjusted centrally, very simply and very quickly. Alternatively or in addition, the monitoring unit can be designed for programming the load threshold and/or the overload threshold of the at least one load holder.

Regarding the data transfer module of the monitoring unit, the possible modifications as for the above-described data transfer module of the load holder apply analogously.

According to a further aspect, the monitoring unit is designed to provide the data received by the at least one load holder via WLAN.

In one preferred embodiment, the load holder system has several (at least two) load holders. The monitoring unit and the several load holders highly preferably form a radio network. In order to keep the energy demand low, a size of the transferred data packets can be limited.

The monitoring unit can be designed to evaluate, store and/or display a temperature distribution and/or a temperature profile of the temperatures measured by the several load holders and received by the monitoring unit.

The above object is also achieved by means of a suspension system of loads on at least one suspension point. The suspension system has at least one wire rope and/or at least one chain. Furthermore, the suspension system comprises at least one load holder according to one of the described embodiments and/or a load holder system according to one of the described embodiments. Accordingly, the modifications described apply analogously.

The suspension system also preferably comprises at least one cross-bar.

In a further embodiment, the suspension system has several wire ropes and/or several chains. Alternatively or in addition, the suspension system preferably has several load holders, which are respectively designed according to one of the embodiments described.

The invention is outlined below based on exemplary embodiments and with reference to the figures. In this case, all features described and/or depicted as an image constitute, on their own or in any combination, the subject matter of the invention, regardless of their combination in the claims or their back references.

Figure 1:
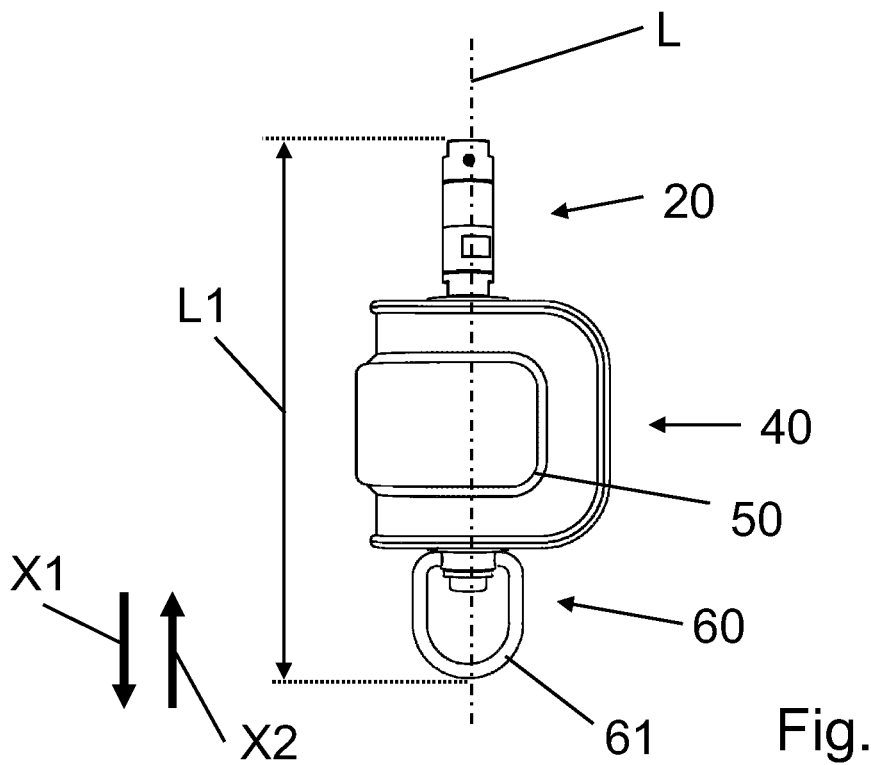
FIG. 1 shows a side view of a load holder according to the invention according to a first embodiment having a levelling module, a measurement module and a load bearing device, wherein a length of the levelling module and thus a length of the load holder in a longitudinal direction are set to a minimum.
Figure 5:
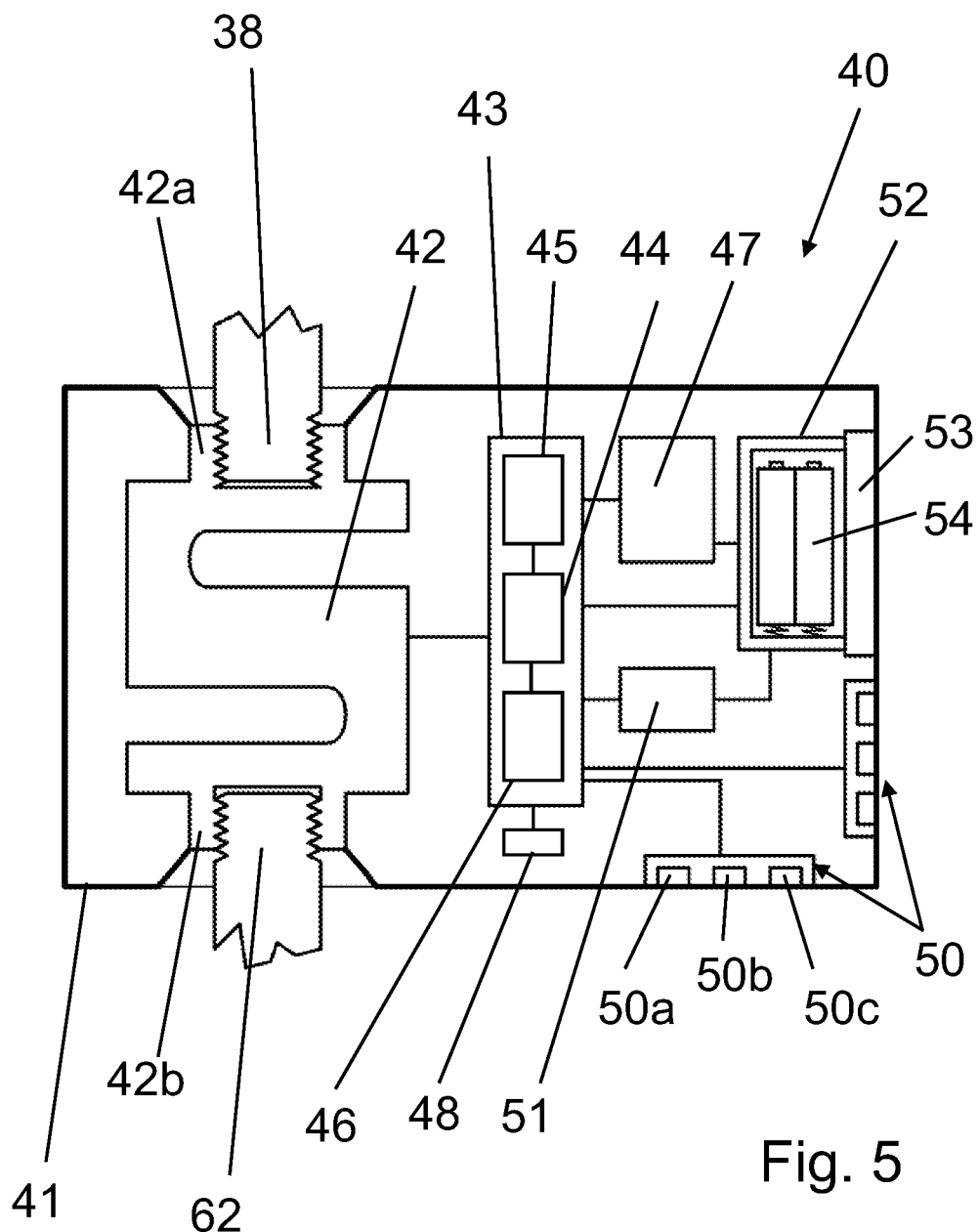
Figure 6:
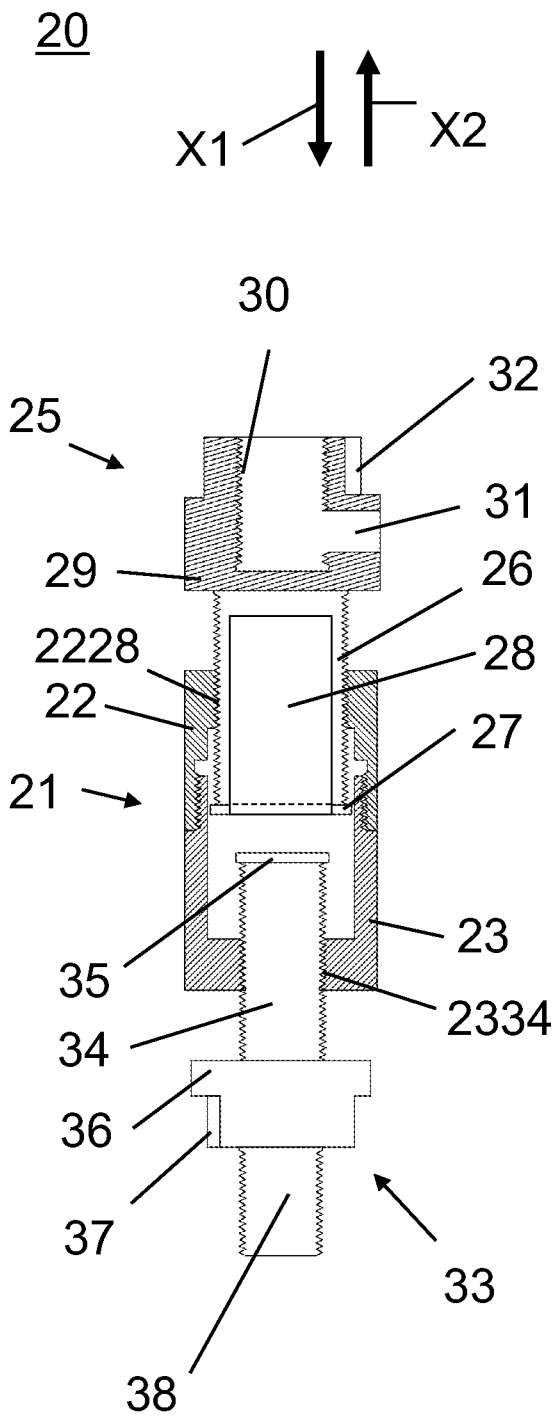
Figure 7:
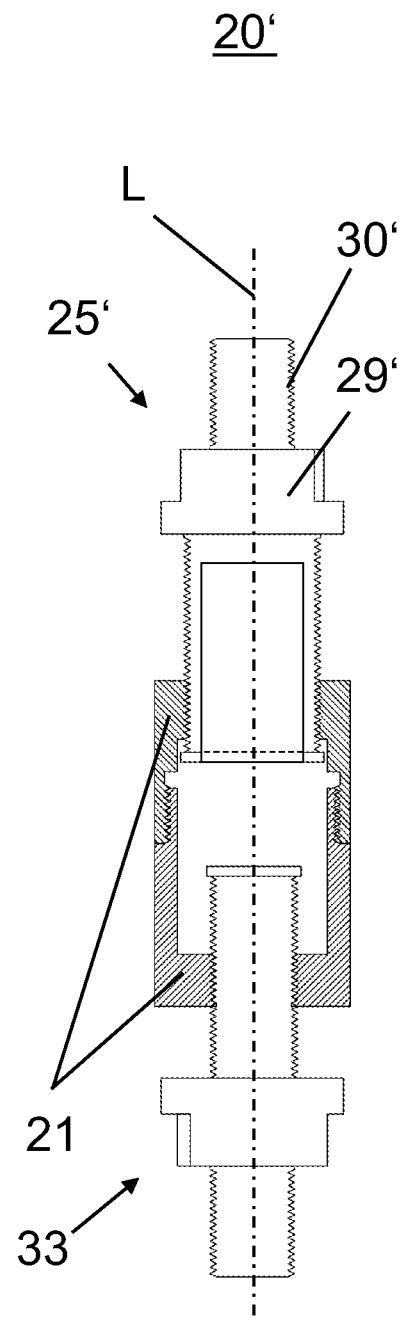
Figure 8:
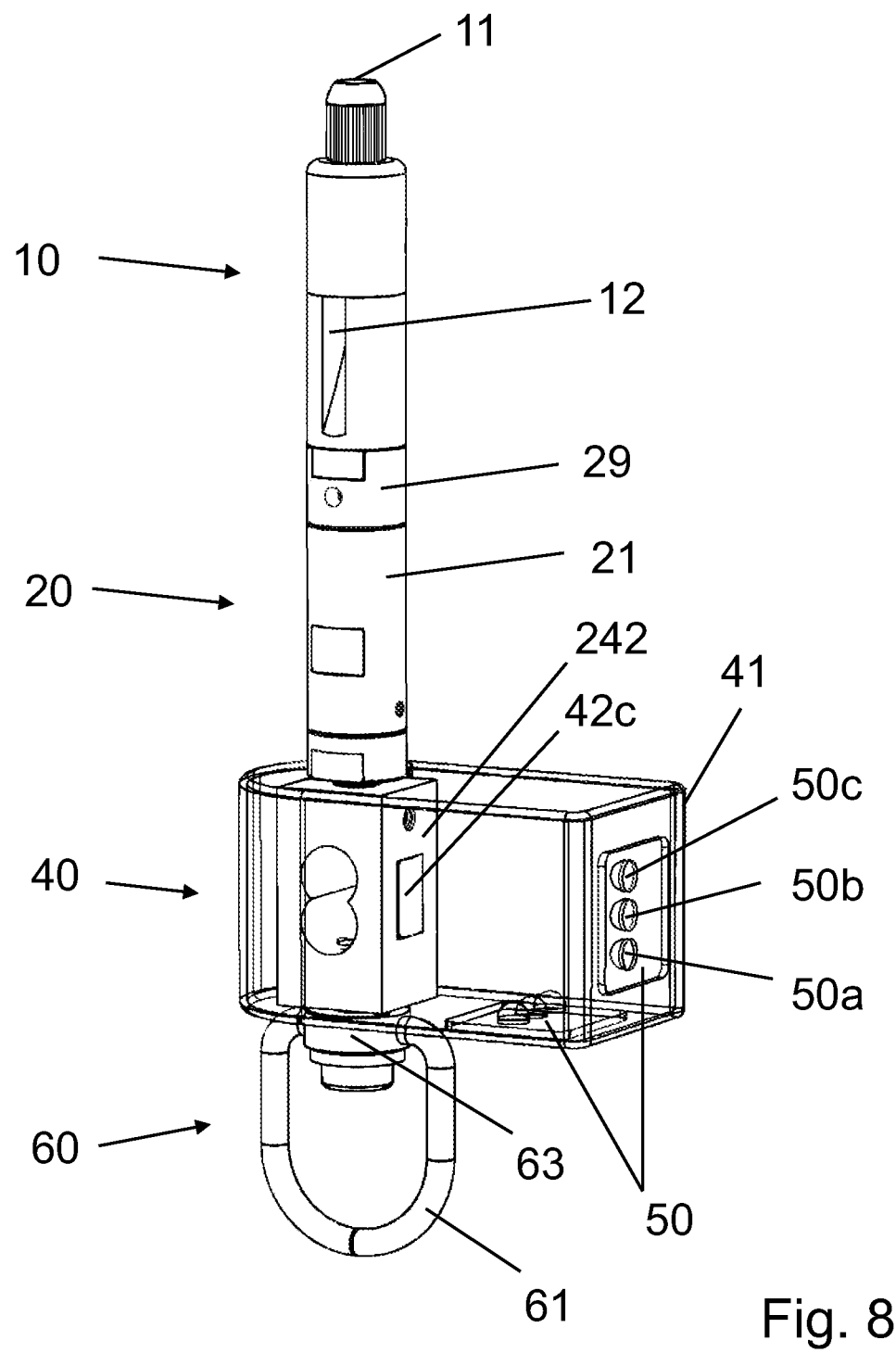
Figure 9:
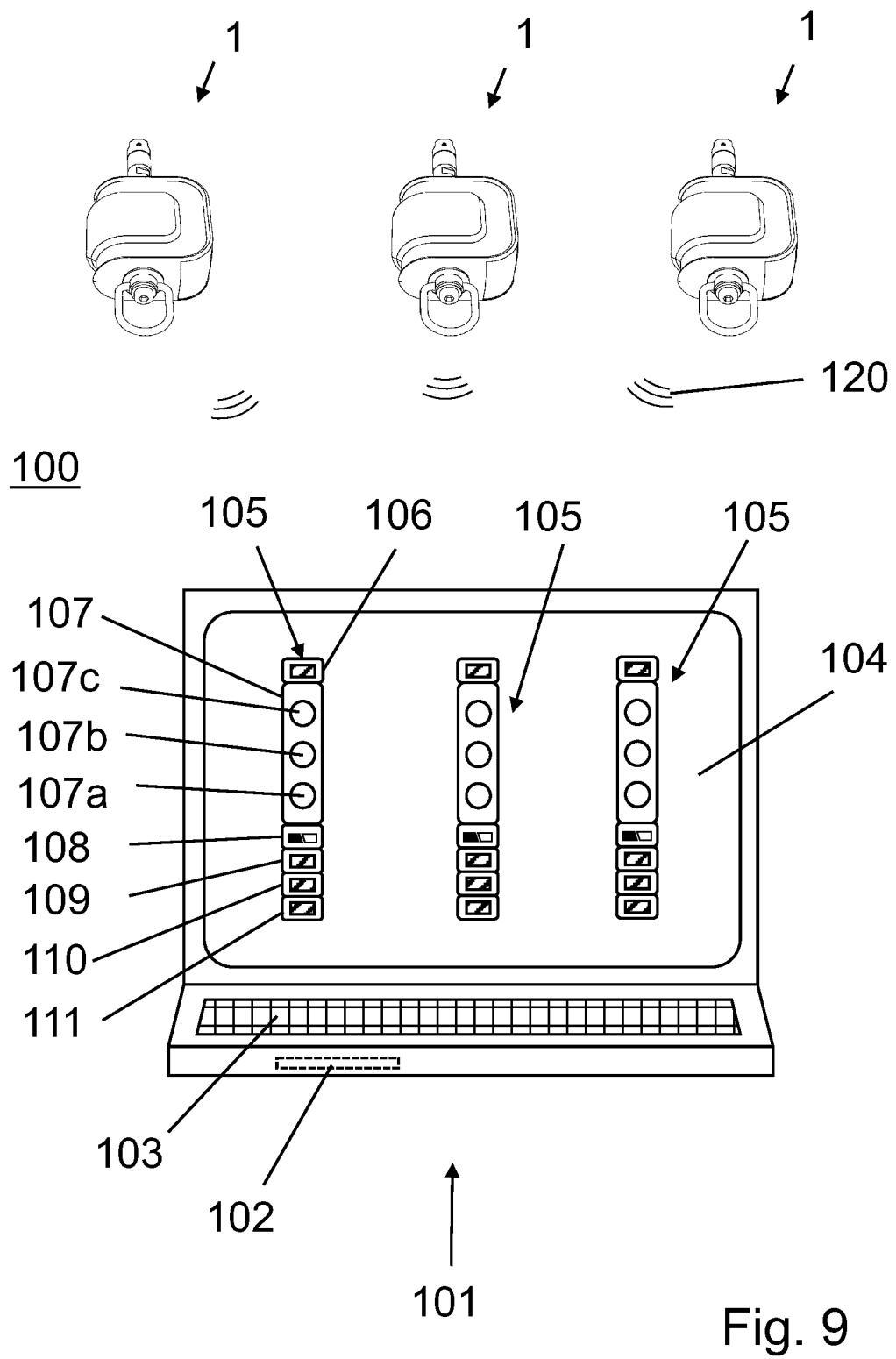

FIG. 5 schematically shows a structure of the measurement module of the load holder from FIG. 1;

FIG. 6 shows a schematic longitudinal section of the levelling module of the load holder from FIG. 1;

FIG. 7 shows a schematic longitudinal section of a further embodiment of the levelling module, in which an external thread is formed on the flange of the first winding-out module instead of an internal thread as the fastening means for releasably fastening the suspension module;

FIG. 8 shows a perspective view of a load holder according to the invention according to a second embodiment, wherein this load holder additionally has a wire rope holder which is releasably attached to an end of the levelling module facing away from the load bearing device; and FIG. 9 shows a load holder system having three load holders according to the first embodiment and a central monitoring unit for the wireless monitoring and programming of the load holders.

A load holder 1 according to the invention shown in FIG. 1 according to a first embodiment for a suspension system comprises a levelling module 20, a measurement module 40 and a load bearing device 60, which are directly attached to one another in this order along a longitudinal direction L of the load holder 1.

A fastening means 30 for releasably fastening a suspension module is formed at a first end of the load holder 1 in the longitudinal direction L, which in this embodiment is formed by a first end (upper end) of the levelling module 20 in the longitudinal direction L. In this embodiment, the fastening means 30 is formed as a tapped hole along the longitudinal direction L with an internal thread. By means of the internal thread, the wire rope holder 10 shown in FIG. 8 can, for example, be releasably attached to the upper end of the levelling module 10. Alternatively, a chain hoist engagement means (not shown) can be attached to the fastening means 30 as a suspension module. An eye bolt can be used, for example, as such a chain hoist engagement means. The eye bolt can be releasably attached to the levelling module 20, similar to the wire rope holder 10, by it being screwed into the fastening means 30 formed as an internal thread.

The load bearing device 60 is arranged at a second end of the load holder 1 in the longitudinal direction L, which faces away from the first end.

One direction X1 is parallel to the longitudinal direction L and runs from the first end to the second end. One direction X2 is also parallel to the longitudinal direction L and runs from the second end to the first end, i.e. precisely opposite to the first direction X1.

The measurement module 40 is arranged in the longitudinal direction L between the levelling module 20 and the load bearing device. The levelling module 20 is thus arranged at a first end (upper end) of the measurement module 40, and the load bearing device 60 is arranged at a second (lower end) of the measurement module 40.

The load bearing device 60 is releasably attached to the measurement module 40. For this purpose, the load bearing device 60 has a fastening means 62, and the measurement module 40 has a corresponding fastening means 42b. Here, the fastening means 62 of the load bearing device 60 is designed as a threaded bolt. The fastening means 42b of the measurement module 40 is designed as a matching internal thread. More precisely, the fastening means 42b of the measurement module 40 is formed integrally with a load cell 42 of the measurement module 40 on a second end (lower end) of the load cell 42 (see FIG. 5).

The load bearing device 60 further has a D-shaped ring 61. The D-shaped ring 61 is connected to the fastening means 62 of the load bearing device 60 via a swivel joint 63. The D-shaped ring 61 is freely rotatable about the longitudinal direction L, i.e. by 360°. This prevents shear and/or transverse forces being applied to the measurement module 40.

A cross-bar of the suspension system and/or a load can, for example, be suspended from the D-shaped ring 61. Suspension can be carried out indirectly via wire ropes and/or chains of the suspension system.

The levelling module 20 is also releasably attached to the measurement module 40. For this purpose, the levelling module 20 has a fastening means 38, and the measurement module 40 has a corresponding fastening means 42a. Here, the fastening means 38 of the levelling module 20 is designed as a threaded bolt. The fastening means 42*a* of the measurement module 40 is designed as a matching internal thread. More precisely, the fastening means 42*a* of the measurement module 40 is formed integrally here with the load cell 42 of the measurement module 40 on a first end (upper end) of the load cell 42 (see FIG. 5).

The load bearing device 60 is only connected to the levelling module 20 via the load cell 42 of the measurement module 40 along the longitudinal direction L. Accordingly, all tensile forces introduced into the D-shaped ring 61 are transferred to the levelling module 20 via the load cell 42.

The structure of the levelling module 20 can be seen in a schematic longitudinal section shown in FIG. 6.

The levelling module comprises a central sleeve 21, a first winding-out module 25 and a second winding-out module 33.

The central sleeve 21 has at least substantially the basic shape of a hollow cylinder with bases at the ends in the longitudinal direction L.

A tapped hole is provided in a first base at a first end (upper end) of the central sleeve 21 along the longitudinal direction L for a first threaded connection 2228 with a sleeve engagement element 26 of the first winding-out module 25. The sleeve engagement element 26 is designed as a threaded bolt here and has an external thread matching this tapped hole.

A tapped hole is provided in a second base at a second first end (lower end) of the central sleeve 21 in the longitudinal direction L, which faces away from the first end of the central sleeve 21, for a second threaded connection 2334 with a sleeve engagement element 34 of the second winding-out module 33. The sleeve engagement element 34 is designed as a threaded bolt here and has an external thread matching this tapped hole.

The sleeve engagement element 26 of the first winding-out module 25 is screwed into the central sleeve 21 by means of the first threaded connection 2228. An unscrewing protection device 27 is attached to a second end (lower end) of the sleeve engagement element 26, which is housed in an interior space of the central sleeve 21. The unscrewing protection device 27 prevents the first winding-out module 25 from being fully unscrewed from the central sleeve 21.

A first end (upper end) of the first winding-out module 25 protrudes from the central sleeve 21 with a first protruding length.

The sleeve engagement element 26 can be further screwed into (screwed deeper into) the central sleeve 21 by the central sleeve 21 being rotated relative to the first winding-out module 25 in a first direction of rotation about the longitudinal direction L. Accordingly, the first protruding length and thus also an entire length of the levelling module 20 and the length of the entire load holder 1 are reduced. The sleeve engagement element 26 can be further screwed out (wind out) of the central sleeve 21 by the central sleeve 21 being rotated relative to the first winding-out module 25 in a second direction of rotation, which is opposite the first direction of rotation. Accordingly, the first protruding length and thus also the entire length of the levelling module 20 and the length of the entire load holder 1 are increased.

The sleeve engagement element 34 of the second winding-out module 33 is screwed into the central sleeve 21 by means of the second threaded connection 2334. An unscrewing protection device 35 is attached to a first end (upper end) of the sleeve engagement element 34, which is housed in the interior space of the central sleeve 21. The unscrewing protection device 35 prevents the second winding-out module 33 from being fully unscrewed from the central sleeve 21.

A second end (lower end) of the second winding-out module 33 protrudes from the central sleeve 21 with a second protruding length. The second protruding length is at the second end of the central sleeve 21, whilst the first protruding length is at the first end of the central sleeve 21 facing away therefrom.

The first threaded connection 2228 and the second threaded connection 2334 have opposite thread directions.

The sleeve engagement element 34 can be further screwed into (screwed deeper into) the central sleeve 21 by the central sleeve 21 being rotated relative to the second winding-out module 33 in the first direction of rotation about the longitudinal direction L. Accordingly, the second protruding length and thus also the entire length of the levelling module 20 and the length of the entire load holder 1 are reduced. The sleeve engagement element 34 can be further screwed out (winded out) of the central sleeve 21 by the central sleeve 21 being rotated relative to the second winding-out module 33 in the second direction of rotation. Accordingly, the second protruding length and thus also the entire length of the levelling module 20 and the length of the entire load holder 1 are increased.

A rotation of the central sleeve 21 along the first direction of rotation therefore leads simultaneously to an increase in the first protruding length and an increase in the second protruding length, and a rotation of the central sleeve 21 along the second direction of rotation leads simultaneously to a reduction in the first protruding length and a reduction in the second protruding length.

A length of the load holder 1 in the longitudinal direction L can thus be adjusted by means of the levelling module 20, even under load. This means that the length adjustment can be used in particular for fine adjustment of the alignment of a load and/or cross-bar suspended from the D-ring 61.

In FIG. 1, the length of the load holder 1 corresponds to a minimum length L1. The first winding-out module 25 and the second winding-out module 33 are screwed into the central sleeve 21 as far as possible (as deep as possible). The flange 29 of the first winding-out module 25 abuts the central sleeve 21, and the flange 37 of the second winding-out module 33 abuts the central sleeve 21.

Figure 2:
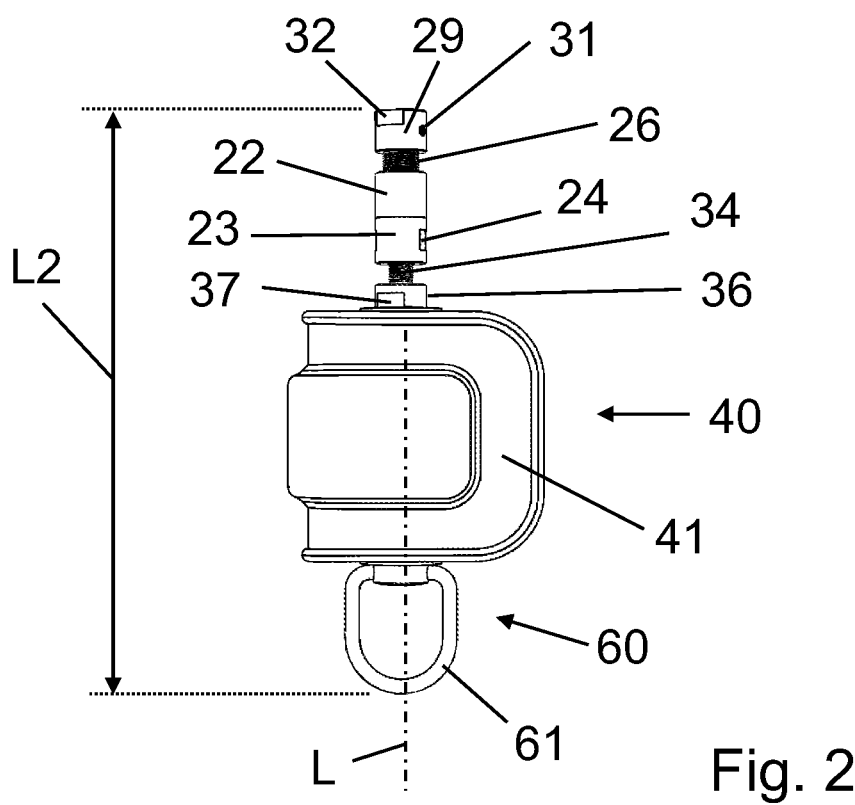
FIG. 2 shows a side view of the load holder from FIG. 1, wherein a length of the levelling module of the load holder and thus the length of the load holder in the longitudinal direction are set to a maximum by a first u winding-out module and a second winding-out module of the levelling module being screwed out (wound out) of a central sleeve of the levelling module to the maximum.
Figure 3:
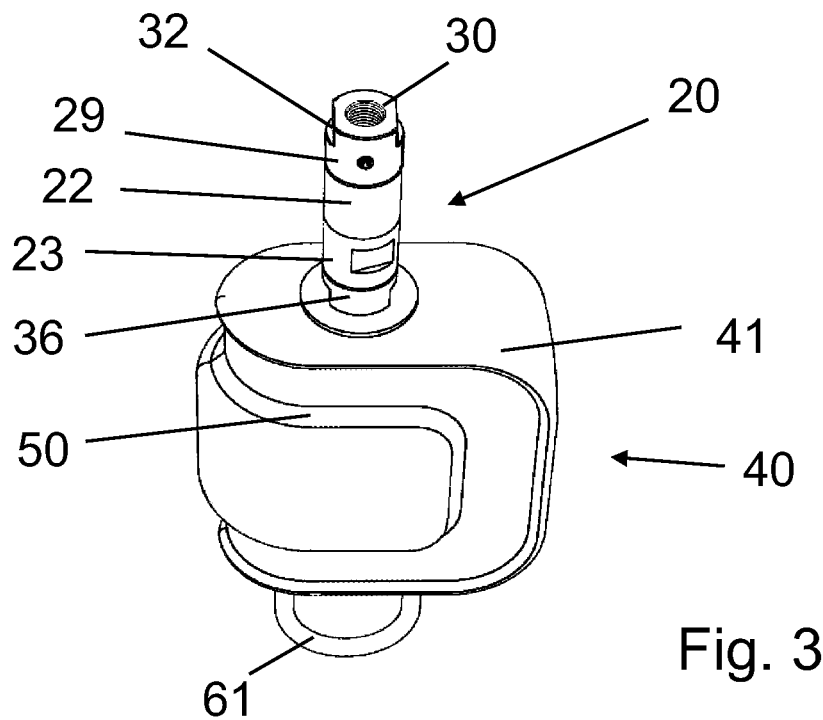
FIG. 3 shows a perspective view of the load holder from FIG. 1 obliquely from above, in which a fastening means for releasably fastening a suspension module to a first end of the load holder can be seen particularly clearly, wherein the fastening means is designed as an internal thread in the first winding-out module of the levelling module.
Figure 4:
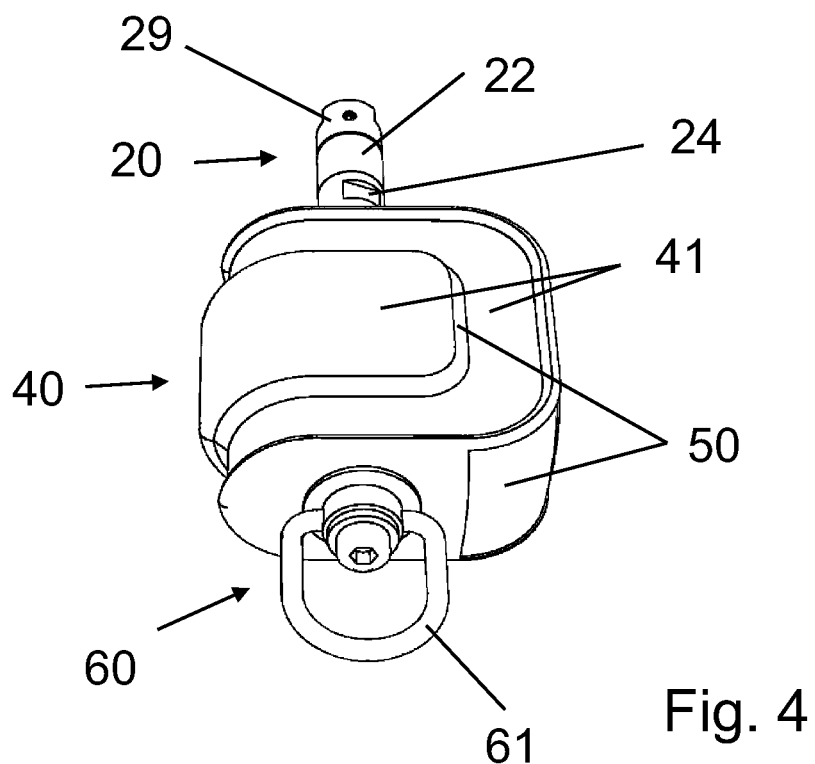
FIG. 4 shows a perspective view of the load holder from FIG. 1 obliquely from below, in which the load bearing device can be seen particularly clearly.

In FIG. 2, the length of the load holder 1 corresponds to a maximum length L2. The first winding-out module 25 and the second winding-out module 33 are screwed out (wound out) of the central sleeve 21 as far as possible. The unscrewing protection device 27 of the first winding-out module 25 abuts the first base of the central sleeve 21, and the unscrewing protection device 37 of the second winding-out module 33 abuts the second base of the central sleeve 21.

A spanner area 24 is formed on a circumferential surface of the central sleeve 21 (see for example FIG. 2). The spanner area is adapted to engage with a spanner jaw of a spanner. As a result, the central sleeve 2 can be easily rotated about the longitudinal direction L.

In the present embodiment, the central sleeve 21 consists of a first sleeve part 22 (upper sleeve part 22) and a second sleeve part 23 (lower sleeve part 23). The two sleeve parts 22, 23 are screwed together. This structure of the central sleeve 21 facilitates the production of the levelling module 20, in particular taking into account the unscrewing protection devices 27 and 35.

The levelling module 20 has a first length scale which is designed for reading how far the first winding-out module 25 has been screwed out (wound out) of the central sleeve 21 in the longitudinal direction L. In this embodiment, the first length scale is arranged on a circumferential surface of the sleeve engagement element 26 and extends along the longitudinal direction L (not shown). The levelling module 20 analogously has a second length scale which is designed for reading how far the second winding-out module 33 has been screwed out (wound out) of the central sleeve 21 in the longitudinal direction L. In this embodiment, the second length scale is arranged on a circumferential surface of the sleeve engagement element 34 and extends along the longitudinal direction L (not shown).

In the present embodiment, the sleeve engagement element 26 of the first winding-out module 25 has a cavity 28, which opens towards the second (lower side). If the first winding-out module 25 and the second winding-out module 26 are completely screwed into (wound into) the central sleeve 21, the first end (upper end) of the sleeve engagement element 34 of the second winding-out module 33 is received in the cavity 28. As a result, the levelling module 20 is more compact. In this embodiment, the cavity 28 has a (at least substantially) cylindrical shape.

The first winding-out module 25 has a flange 29. The flange 29 is attached to a first end (upper end) of the sleeve engagement element 26 of the first winding-out module 25, which faces away from the second end of the sleeve engagement element 26. In particular, the flange 29 can be formed in one piece with the sleeve engagement element 26.

The fastening means 30 for releasably fastening the suspension module is formed at a first end (upper end) of the first winding-out module 25, which faces away from the central sleeve 21, i.e. on the flange 29. As already described, the fastening means 30 in this embodiment is formed as a tapped hole along the longitudinal direction L with an internal thread.

A tapped hole 31 for a locking screw (not shown) to secure the attachment of the suspension module is also formed in the flange 29. The tapped hole 31 extends (at least substantially) along a radial direction transverse to the longitudinal direction through a side wall of the flange 29.

In addition, the flange 29 has a spanner area 32. The spanner area 32 makes it easier to hold the second winding-out module 33 when the central sleeve 21 is rotated and/or when the suspension module is screwed in or unscrewed.

The second winding-out module 33 has a flange 36. The flange 36 is attached to a second end (lower end) of the sleeve engagement element 34 of the second winding-out module 33, which faces away from the first end of the sleeve engagement element 34. In particular, the flange 36 can be formed in one piece with the sleeve engagement element 34.

The fastening means 38 is formed at a second end (lower end) of the second winding-out module 33, which faces away from the central sleeve 21, i.e. on the flange 36. As already described, the fastening means 38 of the levelling module 20 is designed as a threaded bolt and screwed into the fastening means 42a of the load cell 42 of the measurement module 40 (see FIG. 5).

In addition, the flange 36 has a spanner area 37. The spanner area 37 makes it easier to screw in and unscrew the fastening means 38 formed as a threaded bolt. It also makes it easier to hold the second winding-out module 33 if the central sleeve 21 is rotated.

In a modification, the levelling module 20 and the measurement module 40 can be arranged interchangeably along the longitudinal direction (not shown). The levelling module 20 can simply be turned around in the longitudinal direction L. The fastening means 62 of the load bearing device 60 formed as an external thread is then releasably screwed to the fastening means 30 of the levelling module 20 formed as an internal thread. The fastening means 42a of the measurement module 40 formed as an internal thread then constitutes the fastening means for releasably attaching the suspension module.

FIG. 7 shows a modified levelling module 20'. The levelling module 20' substantially corresponds to the levelling module 20 shown in FIG. 6 in structure and function. The same reference numbers are therefore used for similar elements and only the differences are explained.

With the levelling module 20', the fastening means 30' is formed as a threaded bolt on a flange 29' of a first winding-out module 25'. It is suitable for attaching a ring nut as suspension module. Accordingly, no tapped hole is provided for a locking screw in the flange 29'.

The measurement module 40 is used to measure the tensile load. A structure of the measurement module 40 for the first embodiment of the load holder 1 shown in FIG. 1 and for the second embodiment of the load holder 200 shown in FIG. 8 is schematically illustrated in FIG. 6.

The measurement module 40 has an at least water-repellent sealed housing 41. The load cell 42, an electronic module 43, a data transfer module 47, a temperature sensor 48, an optical warning device 50, an audible warning device 51 and an energy storage receptacle 52 are arranged in the housing 41.

The energy storage receptacle 52 is formed as a battery compartment. Several energy storage modules 54 are accommodated in the battery compartment. The energy storage modules 54 can be batteries or accumulators. The battery compartment is closed to the outside by a cover 53. The cover 53 can be opened to replace the energy storage modules 54. The energy storage modules 54 supply the measurement module 40 with electrical energy. A battery life of the measurement module 40 is at least fourteen days in operation.

In this embodiment, the energy storage receptacle 52 is directly connected to the electronic module 43, the data transfer module 47 and the audible warning device 51. The energy storage receptacle 52 can additionally be directly connected to other elements of the measurement module, for example to the optical warning device 50, the temperature sensor 48 and/or the load cell 42.

The load cell has a substantially Z-shaped basic shape and is made from an aluminium alloy. As mentioned before, the load cell 40 has the fastening means 42a for the levelling module 20 at the first end in the longitudinal direction L, and the fastening means for the load bearing device 60 at the second end in the longitudinal direction L.

The load cell 42 further has at least one strain gauge 42c (not shown in FIG. 6, but see FIG. 8). The tensile load is measured in this embodiment by means of a strain gauge full bridge.

The electronic module 43 comprises a processing unit 44 and at least one storage unit 45. The storage unit 45 is arranged inside the housing 41 and thus protected against access and manipulations. Furthermore, the electronic module 43 has a safety unit 46. The safety unit 46 ensures that certain functions of the measurement module 40 are only unlocked after entering a set authorisation code, for example a re-calibration function.

The load cell 42, data transfer module 47, temperature sensor 48, optical warning device 50 and audible warning device 51 are connected to the electronic module 43.

The load cell 42 and temperature sensor 48 are read out by the electronic module 43. The electronic module 43 comprises a clock unit (not shown), which provides the current date and time. The electronic module 43 stores the measured tensile loads and temperatures at least together with the date and time in the storage unit 45. This progressively documents the measured tensile loads and temperatures. The electronic module 43 also determines a state of charge of the energy storage modules 54.

The electronic module sends the measured tensile loads and temperatures as well as the state of charge to the data transfer module 47.

The data transfer module 47 is designed for the contactless transfer of data between the measurement module 40 and a data carrier module 102 of a central monitoring unit 100 (see FIG. 9). It transfers the measured tensile loads and temperatures as well as the state of charge contactlessly to the central monitoring unit 100.

The data transfer module 47 is designed as a transceiver. It is designed for bidirectional data transfer. The electronic module 43 can be contactlessly programmed via the data transfer module 47. In addition, the load holder 1 can be wirelessly put in idle mode and woken up from idle mode and wirelessly put in an operating state via the data transfer module 47, In idle mode, the load holder 1 does not carry out any measurement of the tensile load. The load condition is not determined. The optical warning device 50 and the audible warning device 51 are deactivated in idle mode. Correspondingly, the data transfer module 47 sends neither the measured tensile load nor the load condition in idle mode. However, it does remain ready-to-receive for receiving a wake-up signal, for example from the central monitoring unit 101.

In particular, a maximum load threshold and load threshold can be programmed. The maximum load threshold and load threshold are stored in the storage unit 45. A fixed pre-set permitted working load of the load holder 1 and/or an overload threshold are also stored in the storage unit 45. The overload threshold is preferably double the permitted working load. It can therefore suffice to only store one of the two values.

The load threshold and maximum load threshold can be respectively pre-set. For example, the maximum load threshold can be set to the permitted holding load of a suspension point on a ceiling of an exhibition hall if the load holder 1 is to transfer tensile loads to this suspension point. The load threshold can, for example, be set to a value corresponding to eighty percent of the maximum load threshold.

The electronic module 43 determines a load condition of the load holder based on the measured tensile load, load threshold and maximum load threshold.

If the measured tensile load is smaller than the load threshold and maximum load threshold, the electronic module 43 determines a harmless load condition. If the measured tensile load is larger than the load threshold but smaller than the maximum load threshold, the electronic module 43 determines a concerning load condition. If the measured tensile load is larger than the maximum load threshold and/or the permitted working load of the load holder 1, the electronic module determines a critical load condition.

The electronic module 43 controls the optical warning device 50 depending on the load condition. The optical warning device 50 comprises an optical release signal, an optical load warning and an optical maximum load warning.

If the harmless load condition is determined, the optical warning device 50 displays the optical release signal. The optical release signal is a green indicator light. It is clear from the optical release signal that the load holder 1 is switched on and there is no concerning or critical load condition.

If the concerning load condition is determined, the optical warning device 50 displays the optical load warning. The optical load warning is a yellow indicator light. It is clear from the optical load warning that the measured tensile load exceeds the load threshold. If the load threshold is set accordingly, the optical load warning indicates that the measured tensile load has almost reached the maximum load threshold. This warns a user not to increase the tensile load further.

If the critical load condition is determined, the optical warning device 50 displays the optical maximum load warning. The optical maximum load warning is a red indicator light. It is clear from the optical load warning that the measured tensile load exceeds the maximum load threshold and/or the permitted working load of the load holder 1 or load holder 200. The user can then reduce the tensile load and/or take appropriate safety measures.

The optical warning device is visible at least from below if the load holder 1 is suspended.

In the first embodiment of the load holder 1, a first display area of the optical warning device 50 extends over part of a lower side of the housing 41 and part of a side surface of the housing 41. A second display area of the optical warning device 50 extends in a strip-like manner over the remaining side surfaces of the housing 41. The optical warning device 50 is thus visible both from below and from all sides.

In the schematic illustration in FIG. 6 and in a second embodiment of the load holder 200 in FIG. 8, a first display area of the optical warning device 50 is arranged on a lower side of the housing 41 and a second display area is arranged on one of the side surfaces of the housing 41. Other designs and positions of the optical warning device 50 are also possible.

In FIG. 6 and FIG. 8, each of the display areas respectively has a green light-emitting diode (LED) 50a, a yellow LED 50b and a red LED 50c. The green LEDs 50a are used as a green indicator light for the optical release signal, the yellow LEDs 50b are used as a yellow indicator light for the optical load warning and the red LEDs 50c are used as a red indicator light for the optical maximum load warning.

If the measured tensile load exceeds the overload threshold, the electronic module 43 determines an overload state. It controls the optical signalling device 50 to display an optical overload warning. The optical overload warning differs from the optical release signal, the optical load warning and the optical maximum load warning. By way of example, the overload signal can be designed in such a way that the green indicator light, the yellow indicator light and the red indicator light (i.e. for example, the green LEDs 50a, the yellow LEDs 50b and the red LEDs 50c) flash simultaneously.

In addition, the electronic module 43 stores the fact that the overload state has been reached in the storage unit 45.

The optical overload signal indicates to the user that the load holder 1 or load holder 200 may no longer be used.

The electronic module 43 also controls the audible warning device 51 depending on the load condition. The audible warning device 51 comprises an audible load warning and an audible maximum load warning.

The audible load warning and the audible maximum load warning are different. The audible load warning can, for example, be a short warning sound that always sounds once when there is a change from the harmless load condition to the concerning load condition. The audible maximum load warning can, for example, be a long warning sound that is repeated at regular intervals when there is a critical load condition.

In addition, the audible warning device 51 can emit an audible overload warning when the overload state is reached. The audible overload warning can, for example, comprise a siren sound that lasts at least for a certain period of time.

A time interval can be stored in the storage unit 45. The time interval can be programmed via the data transfer module, for example by the central monitoring unit 101 in FIG. 9. The measurement module 40 measures the tensile load at regular intervals according to the time interval, determines the load condition, displays the load condition via the optical warning device 50 and, if necessary, additionally outputs the load condition via the audible warning device 51. Furthermore, the measurement module 40 stores the measured tensile load, the measured temperature and the load condition together with the date and time in the storage unit 45 and sends at least the measured tensile load, the measured temperature and the state of charge via the data transfer module 47, for example to the central monitoring unit 101 in FIG. 9.

If the time interval is set to zero, the measurement module 40 works continuously.

FIG. 8 shows a second embodiment of a load holder 200 according to the invention. The load holder 200 substantially corresponds to the load holder 1 shown in FIG. 1 in structure and function. The same reference numbers are therefore used for similar elements and only the differences are explained.

The main difference is that the load holder 200 in FIG. 8 additionally has a wire rope holder 10 as suspension module.

The wire rope holder 10 is releasably attached to the fastening means 30 of the levelling module 20. The wire rope holder 10 has a matching fastening means in the form of a bolt (not shown). A wire rope can be inserted into the wire rope holder 10 through a central opening 11 at a first end (upper end) of the wire rope holder 10, which faces away from the levelling module 20, passed partially through the wire rope holder 10 and guided out again through a lateral wire rope opening 12 in a circumferential surface of the wire rope holder 10. The wire rope is securely clamped in the wire rope holder 10. The load holder 200 can thus be suspended from a suspension point or from a cross-bar via the wire rope holder 10 and a wire rope.

In addition, the measuring cell 242 of the load holder 200 is not of substantially Z-shaped design, but rather has a cuboid basic shape with a central recess. In addition, a strain gauge 42c can be seen in FIG. 8.

The electronic module 43, the data transfer module 47, the energy storage receptacle 52, the cover 53, the energy storage modules 54 and the audible warning device 51, which are shown in FIG. 6, are also present in the measurement module 40 in FIG. 8 and only not illustrated in FIG. 8 for clarity.

FIG. 9 shows a load holder system 100 having three load holders 1 according to the first embodiment shown in FIG. 1 and the central monitoring unit 101.

The load holders 1 communicate with their respective data transfer module 47 with the data transfer module 102 of the central monitoring unit 101 via radio signals 120. The radio signals are transmitted in a freely accessible frequency range, for example in the 868 MHz band (SRD band Europe) and/or in the 915 MHz band (ISM band, region 2).

The load holders 1 and the central monitoring unit 101 form a wireless network, for example a Bluetooth Low Energy wireless network, a Zigbee wireless network or a Long Range Wide Area wireless network.

The central monitoring unit 101 is used for programming the load holders 1 as well as for receiving, displaying and logging the measurement data collected by the load holders 1.

In particular, each of the load holders 1 transmits at least the respectively measured tensile load, the measured temperature and the state of charge to the central monitoring unit 101 at regular intervals.

The monitoring unit 101 is designed as a notebook in FIG. 9. It can instead be designed as a smartphone, tablet computer or personal computer, for instance.

In the embodiment shown, the monitoring unit 101 comprises input means 103 in the form of a keyboard and a screen 104. In a further embodiment, the screen 104 can be designed as a touchscreen and serve as an input means instead or in addition.

An overview display of the information regarding the load holders 1 can be displayed on the screen 104. A status indicator 105 is provided for each load holder 1. In this case, the status indicators 105 can be positioned on the screen 104 relative to one another in such a way as to correspond to the real spatial positioning of the load holders 1.

Each of the status indicators 105 have a tensile load display 106 for the tensile load, a load condition display 107 for the load condition, a state of charge display 108 for the state of charge, a load threshold display 109 for the pre-set load threshold and/or a maximum load display 110 for the pre-set maximum load threshold of the associated load holder 1. The individual display elements can be shown or hidden as desired. If a time interval greater than zero is provided for the measurements of the load holder 1, the last determined value is displayed in each case.

For each of the load holders 1, the pre-set load threshold can be set via the associated load threshold display 109. The set load threshold is transmitted via the data transfer module 102 and data transfer module 47 to the measurement module 40 of the respective load holder 1 and stored in its storage unit 45. The maximum load threshold can be set via the maximum load display 110 in the same way, Moreover, the associated time interval can be set by means of the monitoring unit 101 for each of the load holders 1. In addition, each of the load holders 1 can be moved from the operating state to idle mode and woken up from idle mode and put into the operating state by means of the monitoring unit 101.

The load condition display 107 constitutes the load condition of the associated load holder 1 in traffic light form. A green indicator light 107a lights up for a harmless load condition, a yellow indicator light 107b lights up for a concerning load condition, and a red indicator light 107c lights up for a critical load condition. It can instead be provided that the monitoring unit 101 only displays the measured tensile load.

Of course, load holders 200 according to the second embodiment, as shown in FIG. 8, can also be used in the load holder system 100.

The load holder 1 according to the first embodiment and the load holder 200 according to the second embodiment each ensure a higher degree of safety and simplify the correct set-up of the suspension system. They each reduce the risk of loads crashing-down when using the suspension system and simplify the balancing and fine adjustment of the suspended load and/or the suspended crossbar.

The load holder system 100 also enables simple, clear and intuitive monitoring and programming of the load holders 1 or load holders 200 of the suspension system.

REFERENCE LIST 1 load holder
10 suspension module (wire rope holder)
20, 20' levelling module
21 central sleeve
22, 23 sleeve part
24 spanner engagement
25, 25' (first) winding-out module
26 sleeve engagement element
27 unscrewing protection device
29, 29' flange
30, 30' fastening means
31 tapped hole
32 spanner engagement
33 (second) winding-out module
34 sleeve engagement element
35 unscrewing protection device
36 flange
37 spanner engagement
38 fastening means
40 measurement module
41 housing
42 load cell
42a, 42b fastening means
42c strain gauge
43 electronic module
44 processing unit
45 storage unit
46 safety unit
47 data transfer module
48 temperature sensor
50 optical warning device
50a optical release signal (LED)
50b optical load warning (LED)
50c optical maximum load warning (LED)
51 audible warning device
52 energy storage receptacle (battery compartment)
53 energy storage module (battery)
60 load bearing device
61 ring
62 fastening means
63 swivel joint
100 load holder system
101 monitoring unit
102 data transfer module
103 input means
104 screen
105 status indicator
106 tensile load display
107 load condition display
107a, 107b, 107c indicator light
108 state of charge display
109 temperature display
110 maximum load display
111 load threshold display
120 radio signal
2228 first threaded connection
2334 second threaded connection
L longitudinal direction
L1, L2 length
X1 first direction
X2 second direction

The invention claimed is:

1. A Load holder for a suspension system for suspending loads, comprising:
fastening means for releasably fastening a suspension module to and/or a suspension module on a first end of the load holder;
a load bearing device at a second end of the load holder, which faces away from the first end along a longitudinal direction of the load holder;
a levelling module for adjusting a length of the load holder in the longitudinal direction; and
a measurement module for measuring a tensile load between the load bearing device and the first end,
wherein the levelling modules comprises:
a central sleeve;
a first winding-out module, which engages with the central sleeve via a first threaded connection and protrudes from the central sleeve at a first side of the central sleeve in the longitudinal direction with a first protruding length, wherein the first protruding length can be varied by turning the central sleeve relative to the first winding-out module; and
a second winding-out module, which engages with the central sleeve via a second threaded connection and protrudes from the central sleeve at a second side of the central sleeve in the longitudinal direction, which faces away from the first side, with a second protruding length, wherein the second protruding length can be varied by turning the central sleeve relative to the second winding-out module.

2. The load holder according to claim 1, wherein the measurement module comprises a load cell.

3. The load holder according to claim 1, further comprising an optical warning device, which displays an optical load warning when the measured tensile load exceeds a load threshold, and/or displays an optical maximum load warning when the measured tensile load exceeds a pre-settable maximum load threshold.

4. The load holder according to claim 1, further comprising an audible warning device, which emits an audible load warning when the measured tensile load exceeds the load threshold, and/or emits an audible maximum load warning when the measured tensile load exceeds the pre-settable maximum load threshold.

5. The load holder according to claim 1, wherein the load holder includes a wire rope holder and/or a chain hoist engagement means as the suspension module.

6. The load holder according to claim 1, wherein the suspension module can be releasably attached to the levelling module.

7. The load holder according to claim 1, wherein the load bearing device comprises a ring, shackle or hook, which can be rotated 360° around the longitudinal direction.

8. The load holder according to claim 1, wherein the load holder comprises an energy storage receptacle and/or an energy storage module.

9. The load holder according to claim 1, wherein the first threaded connection and the second threaded connection have opposite thread directions.

10. The load holder according to claim 1, wherein the first winding-out module comprises a sleeve engagement element with an external thread for the first threaded connection on a side facing the central sleeve in the longitudinal direction, wherein the sleeve engagement element of the first winding-out module comprises an unscrewing protection device preventing the first winding-out module from being fully unscrewed from the central sleeve.

11. The load holder according to claim 1, wherein the second winding-out module comprises a sleeve engagement element with an external thread for the second threaded connection on a side facing the central sleeve in the longitudinal direction, and a flange on a second side facing away from the central sleeve in the longitudinal direction, wherein the sleeve engagement element of the second winding-out module has an unscrewing protection device preventing the second winding-out module from being fully unscrewed from the central sleeve.

12. The load holder according to claim 1, wherein the load holder comprises a data transfer module for the wireless transfer of the measured tensile load and/or a load condition of the load holder, wherein the load condition is determined based on the measured tensile load as well as the pre-settable load threshold and/or maximum load.

13. A load holder system for a suspension system for suspending loads having at least one load holder, the at least one load holder comprising:
    fastening means for releasably fastening a suspension module to and/or a suspension module on a first end of the at least one load holder,
    a load bearing device at a second end of the at least one load holder, which faces away from the first end along a longitudinal direction of the at least one load holder,
    a levelling module for adjusting a length of the at least one load holder (in the longitudinal direction,
    a measurement module for measuring a tensile load between the load bearing device and the first end, and
    a data transfer module for the wireless transfer of the measured tensile load and/or a load condition of the at least one load holder, wherein the load condition is determined based on the measured tensile load as well as the pre-settable load threshold and/or maximum load;
    wherein the load holder system further comprises a central monitoring unit with a data transfer module for wireless communication with the at least one load holder,
    wherein the levelling modules of the at least one load holder comprises:
    a central sleeve;
    a first winding-out module, which engages with the central sleeve via a first threaded connection and protrudes from the central sleeve at a first side of the central sleeve in the longitudinal direction with a first protruding length, wherein the first protruding length can be varied by turning the central sleeve relative to the first winding-out module; and
    a second winding-out module, which engages with the central sleeve via a second threaded connection and protrudes from the central sleeve at a second side of the central sleeve in the longitudinal direction, which faces away from the first side, with a second protruding length, wherein the second protruding length can be varied by turning the central sleeve relative to the second winding-out module.

14. The load holder system according to claim 13, wherein the measurement module of the at least one load holder comprises a load cell.

15. The load holder system according to claim 13, wherein the at least one load holder comprises an optical warning device, which displays an optical load warning when the measured tensile load exceeds a load threshold, and/or dis-plays an optical maximum load warning when the measured tensile load exceeds a pre-settable maximum load threshold.

16. The load holder system according to claim 13, wherein the at least one load holder includes a wire rope holder and/or a chain hoist engagement means as the suspension module.

17. The load holder system according to claim 13, wherein the first threaded connection and the second threaded connection have opposite thread directions.

18. The load holder system according to claim 13, wherein the first winding-out module comprises a sleeve engagement element with an external thread for the first threaded connection on a side facing the central sleeve in the longitudinal direction, wherein the sleeve engagement element of the first winding-out module comprises an unscrewing protection device preventing the first winding-out module from being fully unscrewed from the central sleeve, and
    wherein the second winding-out module comprises a sleeve engagement element with an external thread for the second threaded connection on a side facing the central sleeve in the longitudinal direction, and a flange on a second side facing away from the central sleeve in the longitudinal direction, wherein the sleeve engagement element of the second winding-out module has an un-screwing protection device preventing the second winding-out module from being fully unscrewed from the central sleeve.

* * * * *